United States Patent [19]

Radliff et al.

[11] Patent Number: 5,691,508

[45] Date of Patent: *Nov. 25, 1997

[54] ENCLOSURE FOR SPLICED MULTICONDUCTOR CABLE

[75] Inventors: David Ray Radliff, Harrisburg; Todd Richard Okimoto, Pittsburgh; Leung Man Shiu, Harrisburg, all of Pa.

[73] Assignee: The Whitaker Corporation, Wilmington, Del.

[*] Notice: The term of this patent shall not extend beyond the expiration date of Pat. No. 5,606,150.

[21] Appl. No.: 558,569

[22] Filed: Oct. 31, 1995

Related U.S. Application Data

[63] Continuation-in-part of Ser. No. 506,679, Jul. 25, 1995, Pat. No. 5,606,150.

[51] Int. Cl.$^6$ .................................................. H02G 15/113
[52] U.S. Cl. ........................ 174/92; 174/93; 439/397; 439/399
[58] Field of Search .......................... 174/91, 92, 93; 439/397, 399, 402, 405, 406, 407

[56] References Cited

U.S. PATENT DOCUMENTS

| | | | |
|---|---|---|---|
| Re. 26,994 | 12/1970 | Fuller et al. | 174/84 R |
| 3,183,302 | 5/1965 | Wochner et al. | 174/138 |
| 3,383,642 | 5/1968 | Nava et al. | 174/84 R |
| 3,519,731 | 7/1970 | Grunbaum | 174/138 |
| 3,525,799 | 8/1970 | Ellis | 174/84 R |
| 3,656,088 | 4/1972 | Seim | 339/98 |
| 3,718,888 | 2/1973 | Pasternak | 339/98 X |
| 3,757,031 | 9/1973 | Izraeli | 174/138 F |
| 3,793,612 | 2/1974 | Driscoll | 339/98 |
| 3,804,971 | 4/1974 | Bazille, Jr. | 174/88 R |
| 3,836,944 | 9/1974 | Lawson | 339/99 R |
| 3,869,190 | 3/1975 | Bazille, Jr. | 339/98 |
| 3,879,575 | 4/1975 | Dobbin et al. | 174/92 |
| 3,892,460 | 7/1975 | Izraeli | 339/98 |
| 3,899,236 | 8/1975 | Santos | 339/98 |
| 3,912,356 | 10/1975 | Johansson | 339/98 |
| 3,916,086 | 10/1975 | Gillemot et al. | 174/93 |
| 4,178,055 | 12/1979 | Fleischhacker et al. | 339/98 X |
| 4,219,693 | 8/1980 | French | 174/135 |
| 4,435,612 | 3/1984 | Smith | 174/92 |
| 4,451,696 | 5/1984 | Beinhaur | 174/92 |
| 4,643,505 | 2/1987 | House et al. | 339/75 P |
| 4,744,629 | 5/1988 | Bertoglio et al. | 174/92 |
| 4,795,857 | 1/1989 | McInnis | 174/138 F |
| 4,859,809 | 8/1989 | Jervis | 174/92 |
| 4,864,725 | 9/1989 | Debbaut | 29/871 X |
| 4,879,436 | 11/1989 | Braham | 174/92 |
| 4,891,018 | 1/1990 | Afflerbaugh et al. | 439/402 |
| 4,935,582 | 6/1990 | Calligaris | 174/92 |
| 5,046,766 | 9/1991 | Lomberty et al. | 174/92 |
| 5,071,365 | 12/1991 | Fremgen et al. | 439/402 |

(List continued on next page.)

FOREIGN PATENT DOCUMENTS

| | | |
|---|---|---|
| WO 94/09533 | 4/1994 | WIPO . |
| WO 95/02267 | 1/1995 | WIPO . |

*Primary Examiner*—Kristine L. Kincaid
*Assistant Examiner*—Chau N. Nguyen

[57] ABSTRACT

An enclosure (400,500) having a pair of covers fastenable together to close about and seal a cable splice between end portions of a pair of multiconductor cables. At least one routing channel (418 or 420;528) is provided at a first end (406,506) and a single routing channel (424;536) at the second end (408,508), with a splice-receiving region (454) provided adjacent inner ends of the routing channels. Axially- and laterally-staggered outermost and innermost embossments are associated with each routing channel to establish an interruption in a linear path between the cable exits and a grounding region for the multiconductor shielded cables, so that the cables must be substantially bent to course around the embossments in serpentine fashion, defining cable strain relief. A partitioned region (552) in enclosure (500) accommodates receipt of a spliced connection of a pair of single-conductor coaxial cables into a linear routing channel bypassing the grounding region for multiconductor shielded cables.

8 Claims, 12 Drawing Sheets

U.S. PATENT DOCUMENTS

| | | | |
|---|---|---|---|
| 5,080,606 | 1/1992 | Burkard | 439/403 |
| 5,111,001 | 5/1992 | Jervis | 174/92 |
| 5,120,235 | 6/1992 | Kashiwa | 439/405 |
| 5,120,246 | 6/1992 | Knox | 439/402 |
| 5,322,973 | 6/1994 | Dagan | 174/92 |
| 5,330,367 | 7/1994 | Janczak | 439/402 |
| 5,347,084 | 9/1994 | Roney et al. | 174/92 |
| 5,371,323 | 12/1994 | Schneider et al. | 174/92 |
| 5,397,859 | 3/1995 | Robertson et al. | 174/92 |
| 5,415,562 | 5/1995 | Matsumoto et al. | 439/397 |

ENCLOSURE FOR SPLICED MULTICONDUCTOR CABLE

REFERENCE TO RELATED APPLICATION

This is a Continuation-in-Part of U.S. patent application Ser. No. 08/506,679 filed Jul. 25, 1995 now U.S. Pat. No. 5,606,150.

FIELD OF THE INVENTION

The present invention relates to the field of electrical connections, and more particularly to enclosures for spliced cable connections.

BACKGROUND OF THE INVENTION

For electrical cables having a plurality of discrete conductor wires surrounded by an outer jacket, splices of the conductor wires to associated conductor wires of a like cable are occasionally necessary. Such splice connections are desirably insulatively covered in a manner sealing the splices of the individual wire pairs from the environment and most especially from moisture. It is also desirable to place the cable splice connection in an enclosure that provides physical protection to the several splices. One such enclosure is disclosed in U.S. Pat. No. 5,397,859 wherein sealant material within the enclosure assuredly embeds and seals the coaxial cable connector splicing the two coaxial cable ends together. Latches along both sides of the enclosure halves assuredly latch the halves together along both sides eliminating reliance on the integrally molded hinge along one of the sides.

U.S. Pat. No. 5,371,323 discloses a splice housing apparatus for splicing multiconductor shielded cable. The cables enter the enclosure and the several conductors are broken out from the cables and spliced, while portions of the shield are exposed. A ground contact within the enclosure provides a common ground between the shields when the shielded cable portions are inserted into cable-receiving slots of the contact. Sealant material embeds the splices for protection against moisture. Several embodiments provide for same-end cable entrance, where the same contact grounds the shields, or opposite end cable entrance, where there is a ground contact at each end with the contacts then commoned by a shorting bar.

It is desired to provide a single enclosure that permits either butt-splice or in-line cable arrangements as desired on site without special tools.

It is also desired to provide a single enclosure that accommodates in-line splice connections of both a pair of multiconductor shielded cable and conventional single-conductor coaxial cable.

SUMMARY OF THE PRESENT INVENTION

The present invention is an enclosure for a splice connection of a pair of cables, such as multi-conductor cables, and especially cables having multiple twisted pairs and having ground shields therearound within outer jackets. A pair of cover members are securable together around the cable ends to enclose the splice connections of the several conductor wires broken out from the outer jackets and the shield members, and preferably includes sealant material to embed and seal the splice connections and the end portions of the cables. A ground contact mounted within one of the covers is adapted to establish electrical connections with the exposed shield portions of both cables to common them. Preferably a plurality of embossments are disposed throughout the inside surfaces of the cover members, with free ends of the embossments virtually meeting upon closure to provide support against crushing the walls of the cover members, so that the enclosure is suitable for use with underground placement of the cable splice.

In the present invention, certain ones of the embossments define routing channels that include a pair of substantial angles so that the cables must be forcibly bent to assume the angles upon being urged into the routing channels in order to pass around and by the embossments, whereby strain relief is attained. In embodiments adapted for permitting either butt-splice or in-line splice, two routing channels extend from a first end of the enclosure, and one routing channel extends from the second end, to inner ends adjacent a splice region between the first and second ends. For an in-line cable arrangement, one cable end is placed into one of the two routing channels at the first end, and the other is placed in the single channel at the second end. Alternatively, both cables can be placed into respective ones of the two channels of the first end for a parallel or butt-splice cable arrangement.

In another embodiment the enclosure provides a single cable entrance at each end associated with the multiconductor shielded cables, for in-line splicing thereof, with the routing channels passing around outermost and innermost embossments to extend to the grounding and splice-receiving regions midway between the enclosure ends, and also includes a partitioned portion extending between associated cable entrances at the enclosure ends defining a linear routing channel into which may be placed a splice interconnection between a pair of single-conductor coaxial cables, bypassing the grounding region associated with the multiconductor shielded cables.

It is an objective of the present invention to provide an enclosure for a splice connection of a pair of multiconductor shielded cables.

It is another objective for such enclosure to permit either butt-splice or in-line cable arrangements for splicing multiconductor shielded cables, and alternatively to provide for splicing of both a pair of multiconductor shielded cables and a conventional single conductor coaxial cable.

It is an additional objective for the enclosure to comprise a single part to be manipulated and applied as a unit, alleviating any problem of various parts being misplaced or lost.

It is also an objective for such enclosure to provide inherent resistance to crushing, and also contain sealant material to establish an environmentally sealed splice connection.

A further objective of the present invention is to provide an enclosure having a grounding region adapted to establish a ground interconnection between the shield members of the multiconductor shielded cables being spliced.

Embodiments of the present invention will now be described by way of reference to the accompanying drawings.

DETAILED DESCRIPTION OF THE PREFERRED EMBODIMENTS

Figure 1:
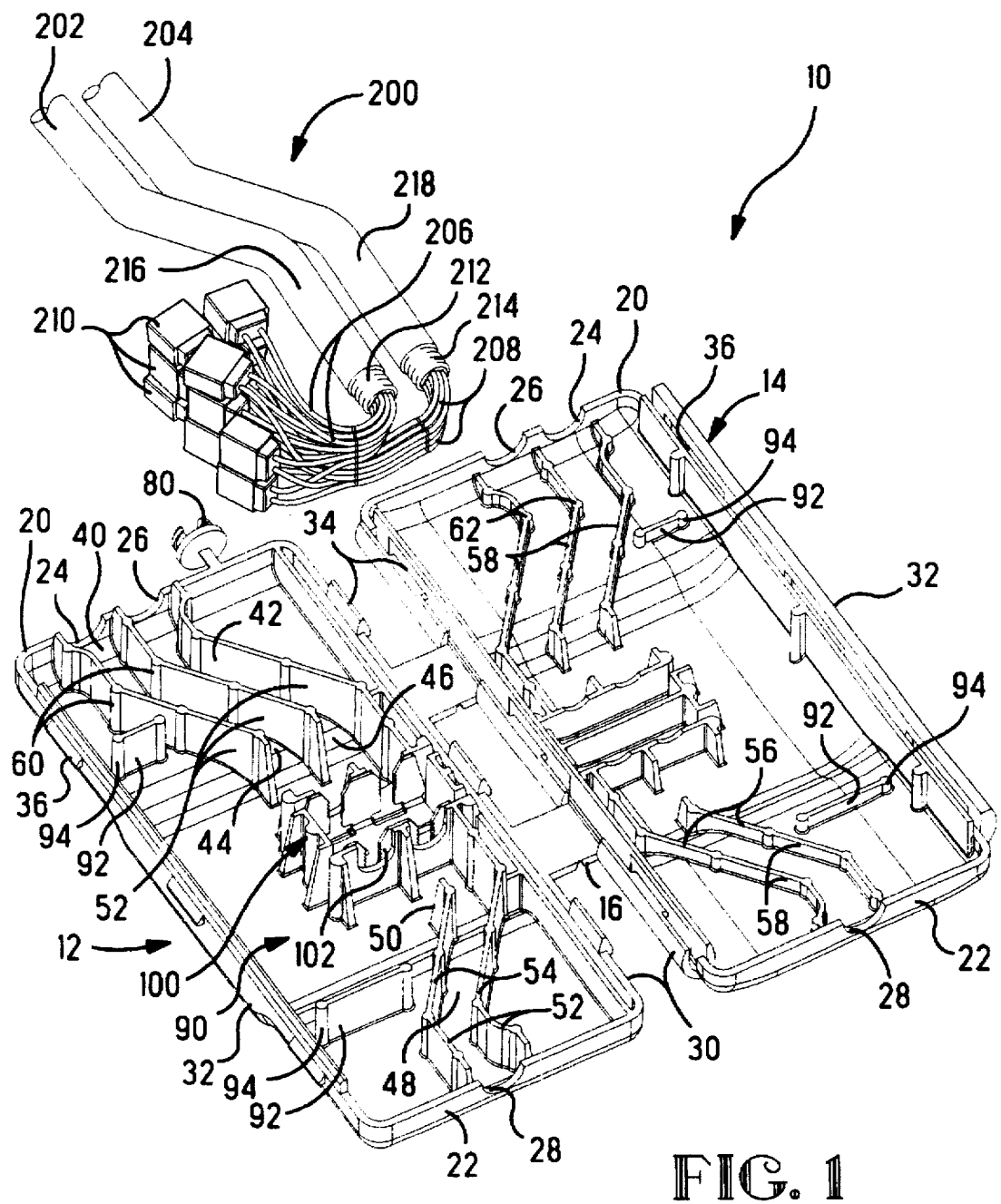
FIGS. 1 and 2 are isometric views of the enclosure of the present invention opened to receive a spliced cable pair in a butt-splice arrangement, with the spliced cable pair shown above the enclosure in FIG. 1 and fully inserted in FIG. 2.
Figure 2:
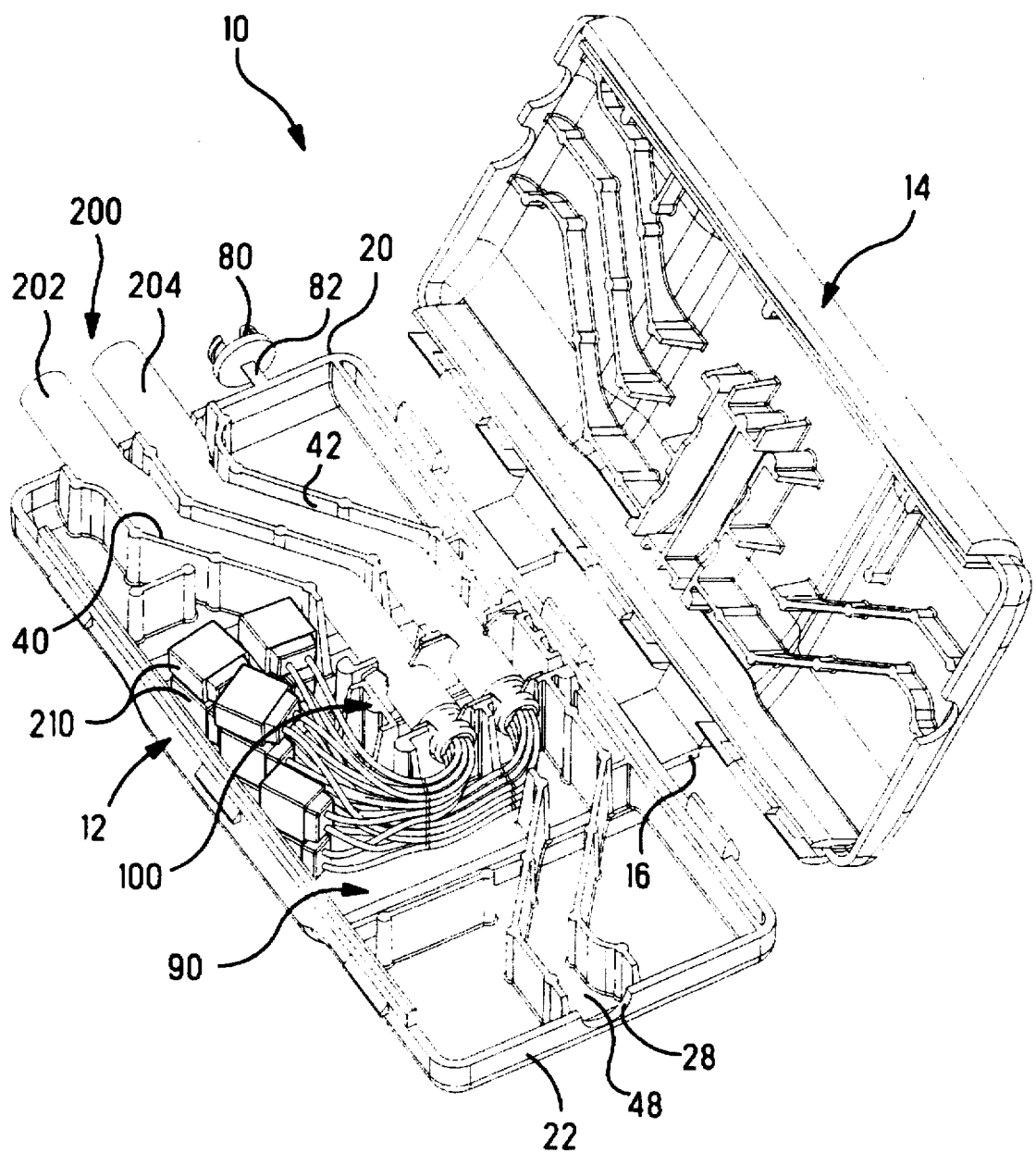
Figure 3:
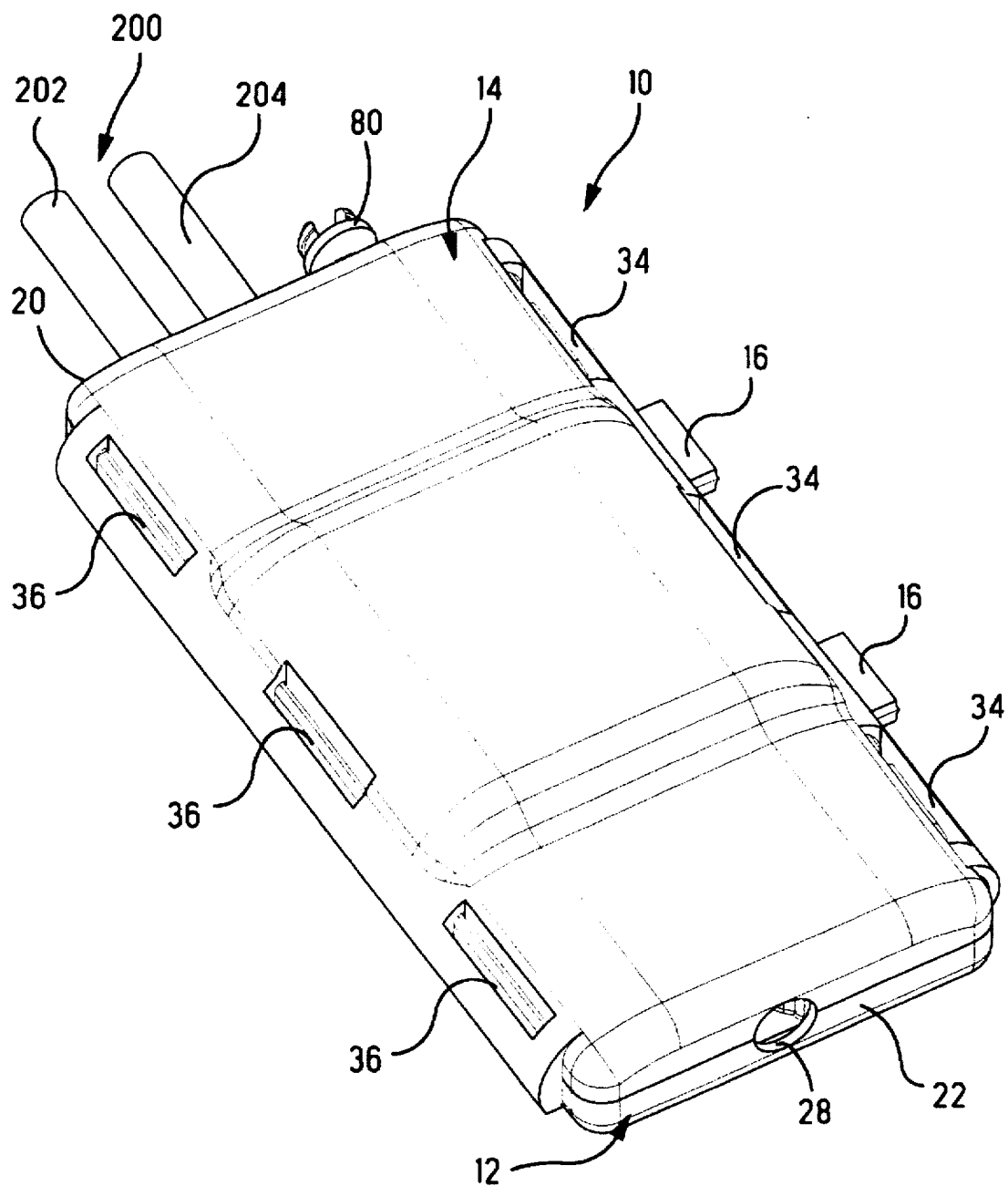
FIG. 3 is an isometric view of the enclosure of FIGS. 1 and 2 after closure about the cable splice.
Figure 4:
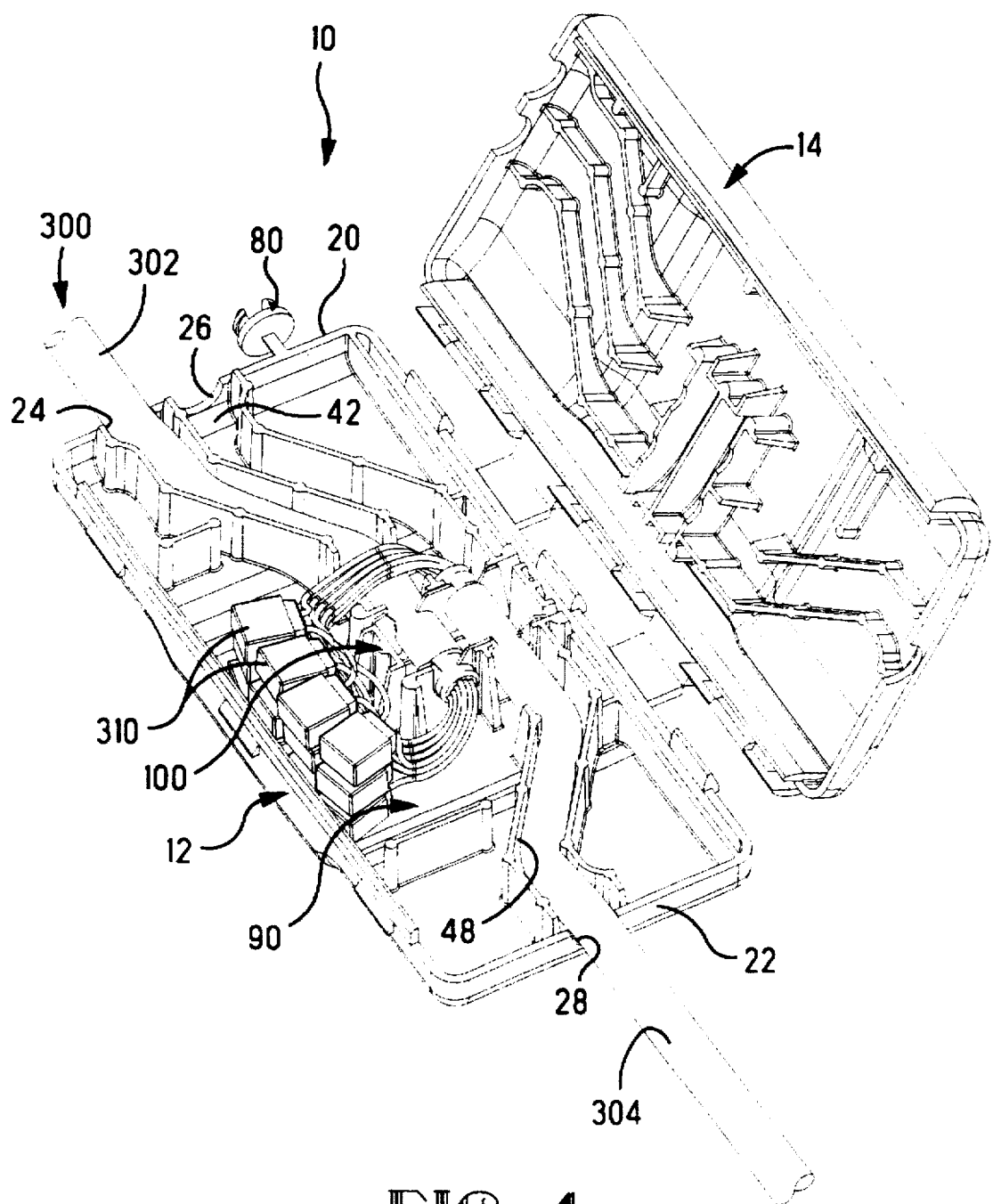
FIGS. 4 and 5 are similar to FIGS. 2 and 3 for an in-line spliced cable pair arrangement.
Figure 5:
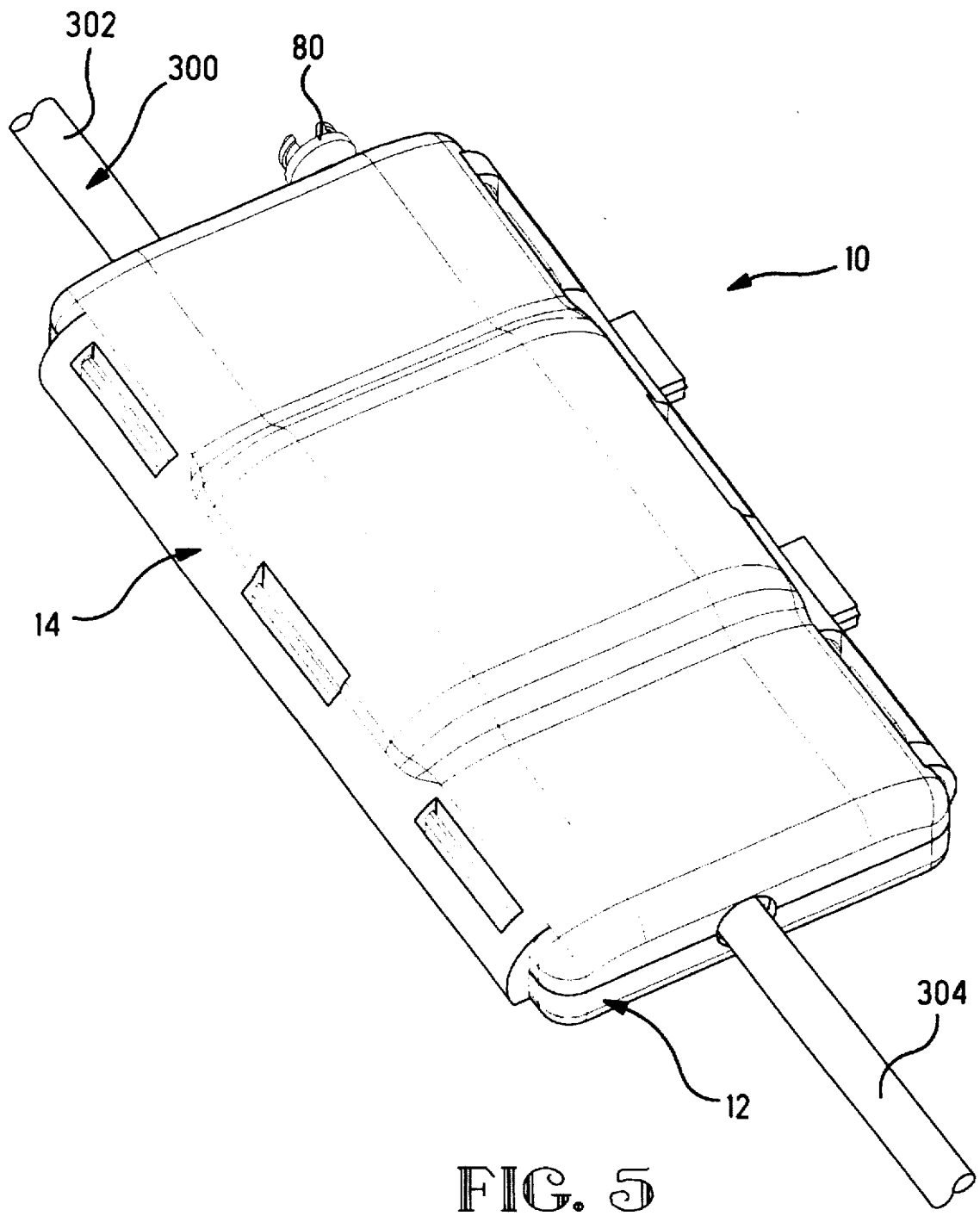

Enclosure 10 of the present invention comprises first and second cover members 12,14 adapted to be closed together about a cable splice to fully enclose the cable splice for sealing therearound and for physical protection thereof. Preferably cover members 12,14 are molded as an integral member joined at a living hinge section 16 facilitating handling as a single unit prior to and during application. First end 20 and second end 22 are provided with cable entrances, first end 20 having a pair of cable entrances 24,26 and second end 22 having a single cable entrance 28. Side walls 30,32 of cover members 12,14 are dimensioned and shaped to abut upon full closure about a cable splice to enable sealing, and cooperating latch sections 34,36 along both side walls 30,32 will secure the cover members to each other so that living hinge section 16 is relieved of any demand to maintain side walls 30 together. Further, the side walls 30,32 of the respective covers cooperate upon full closure in an interleaved arrangement, with a wall of one received into a channel of the other along each edge for assured sealing, preventing egress of sealant material.

Grounding region 100 and splice-receiving region 90 are defined in the interior of the enclosure, with grounding region 100 containing a ground contact 102 affixed thereat to first cover 12. Sealant material is preferably disposed in both first and second cover members 12,14 to fill splice-receiving region 90 and grounding region 100 upon full closure about a cable splice.

Spliced cable pair 200 is seen positioned above enclosure 10 in FIG. 1 at first end 20. Each cable 202,204 has a plurality of discrete conductor wires 206,208 with associated ones thereof spliced together at splice connections 210. Surrounding all the conductor wires are shield members 212,214 of the cables (such as in corrugated or armored cable), and outer jackets 216,218 surrounding the respective shield members have been trimmed to expose portions of the shield members. The conductor wires 206,208 are shown broken out of the respective cable ends, extending from the cable ends for selected lengths so that splice connections 210 may be positioned within splice-receiving region 90 near grounding region 100. Spliced cable pair 200 is shown in a parallel arrangement for a butt-splice, with both cables to extend from a common first end 20 of the enclosure.

A pair of routing channels 40,42 are shown defined in first end 20 coextending from cable entrances 24,26 to respective inner ends 44,46. A single routing channel 48 is defined at second end 22 extending from cable entrance 28 to an inner end 50. The routing 100 channel inner ends are adjacent grounding region 100 with inner ends 44,46,50 aligned so that cable paths of the routing channels will traverse grounding region 100 for establishing ground connections of the ground contact 102 with the shield members of the cables. Side walls 52 of first cover 12 along routing channels 40,42,48 are dimensioned and positioned for free edges 54 thereof to virtually meet free edges 56 of side walls 58 of second cover 14 and thus completely enclose the routing channels about the cables for minimizing ingress of water from the cable entrances and also for minimizing egress of sealant material from splice-receiving region 90 and grounding region 100. Support embossments 60,62 are spaced along side walls 52,58 both to enhance the rigidity of side walls to resist deformation or deflection when cables are disposed along the routing channels, and also for free ends thereof to virtually meet upon full closure of enclosure 10 about the cable splice to support the cover members inwardly from the side walls to prevent crushing, thereby imparting crush resistance to the enclosure such that the enclosure is suitable to be placed in service underground that commonly means that a cable splice enclosure will commonly be placed under compression.

Figure 6:
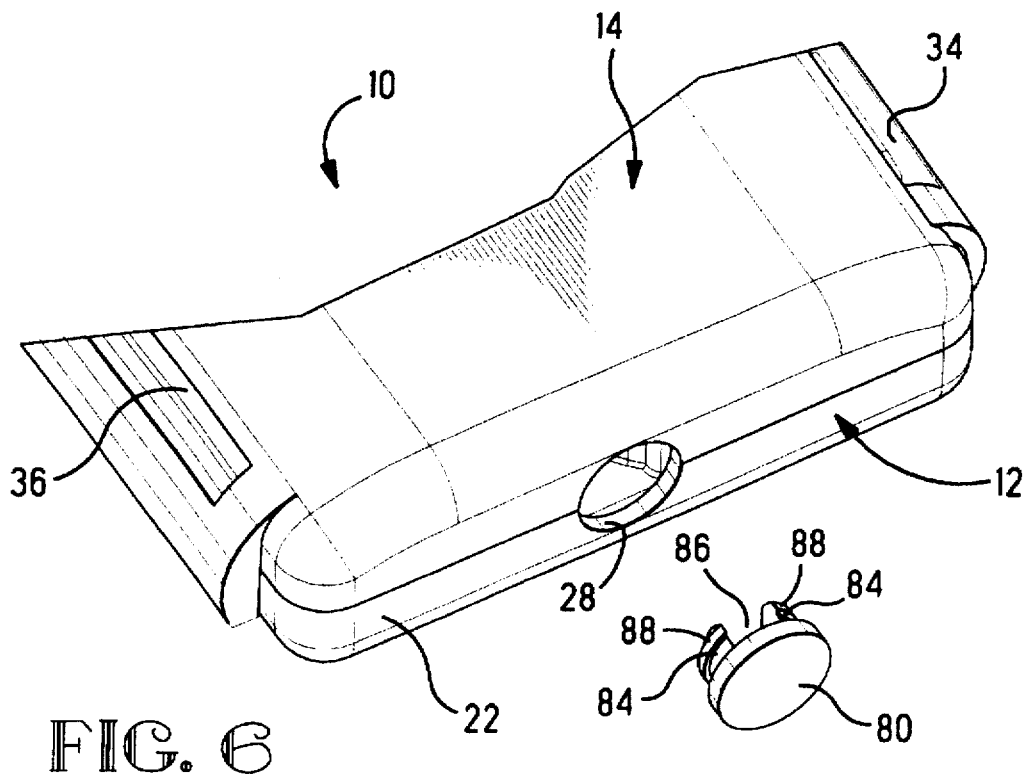
FIGS. 6 and 7 are isometric views of the plug prior to insertion into the unused cable entrance, and afterward, respectively.
Figure 7:
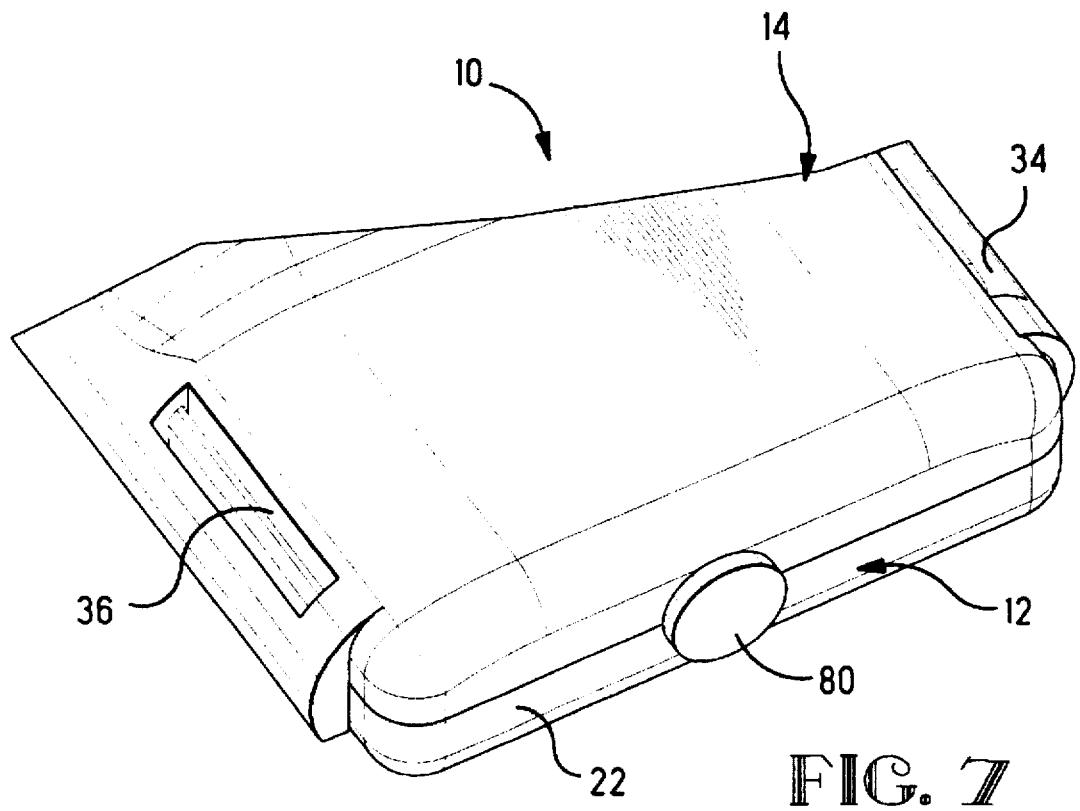

A plug member 80 is seen preferably initially attached integrally to first cover 12 by a frangible section 82, and is easily detachable for use in sealing the unused one of cable entrances 26,28. Referring to FIGS. 6 and 7, plug member 80 is provided with a pair of tines 84 separated by a slot 86. The outer diameter of the semicylindrical tines 84 is selected to match the diameter of the cable entrances, and free ends of the tines are widened and define latching sections 88. Upon insertion of the tines into the cable entrance, the widened free ends are deflected toward each other and upon full insertion resile for latching of latching sections 88 to the periphery of the cable entrance within the enclosure, thus closing off the entrance.

Figure 8:
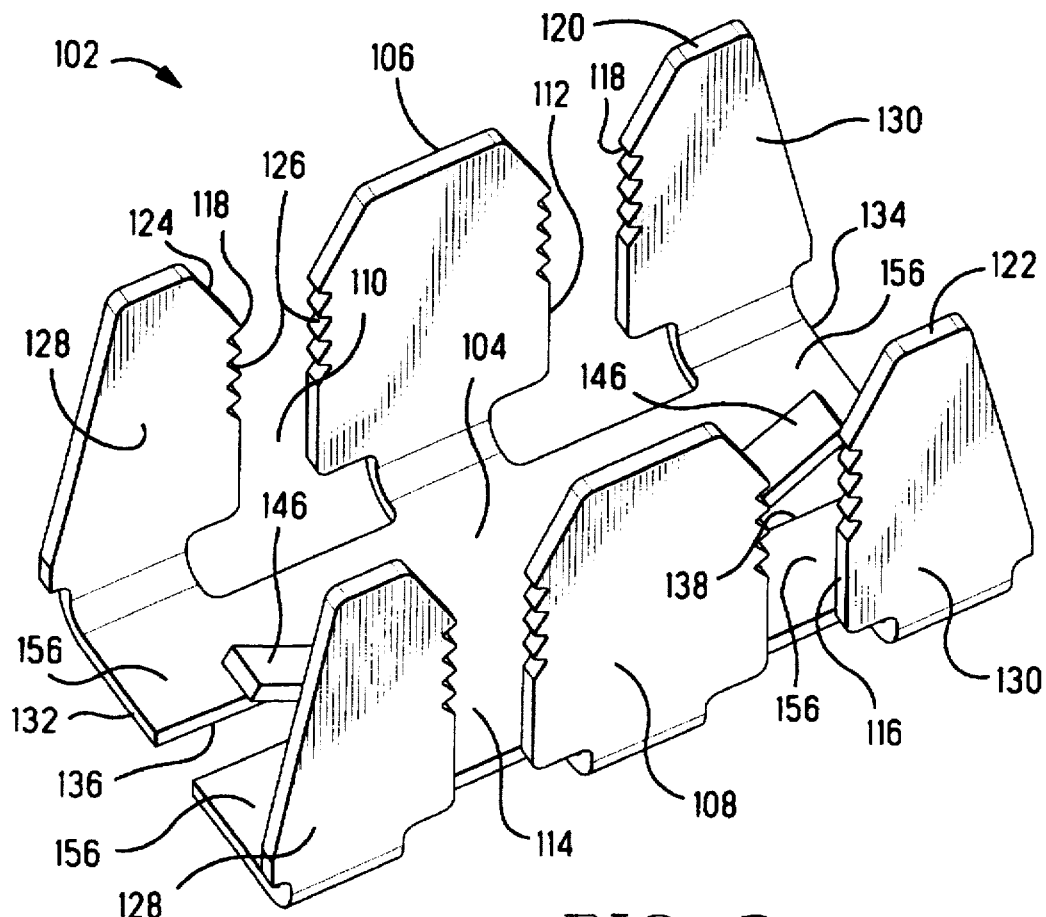
FIGS. 8 and 9 are isometric and elevation views of the ground contact, with FIG. 9 demonstrating deflection of an outer plate portion thereof when a cable would be received into a cable-receiving slot thereof.
Figure 9:
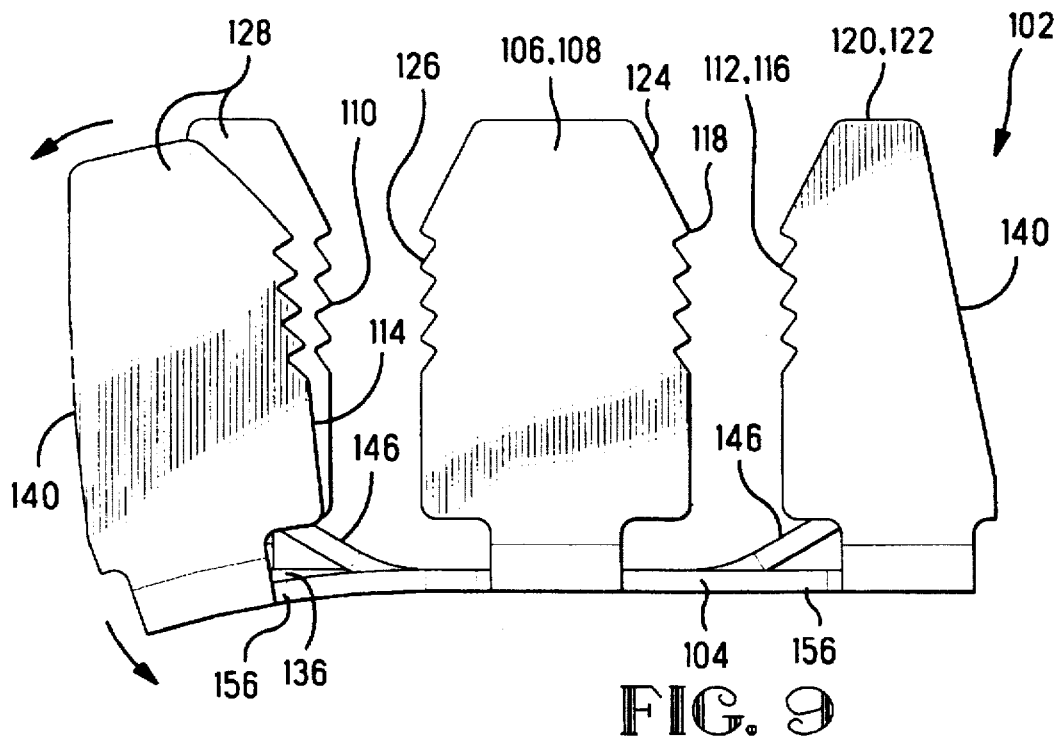
Figure 10:
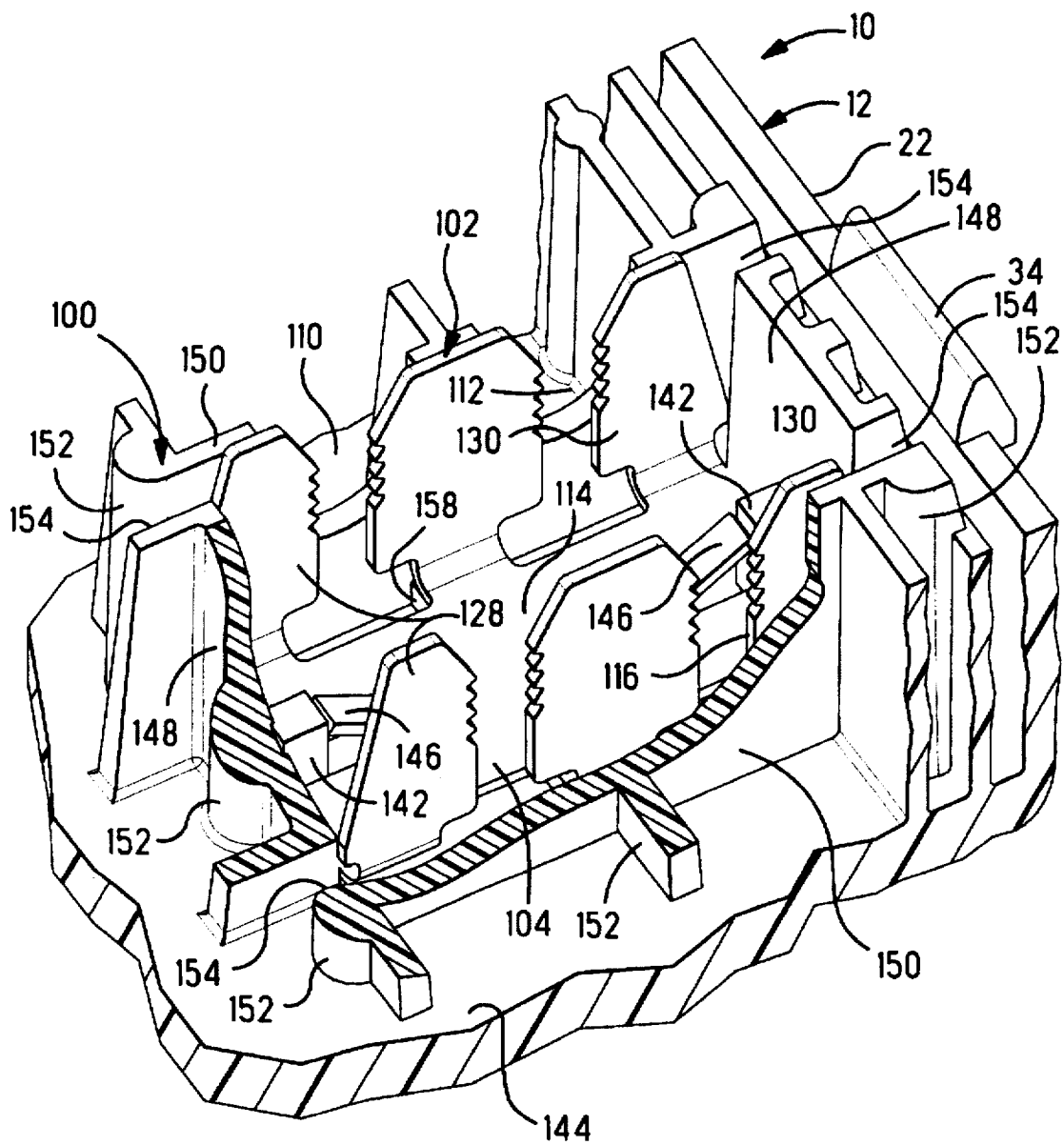
FIG. 10 is an enlarged isometric view of the grounding region of the enclosure illustrating the ground contact affixed to the first cover.

Grounding region 100 is best seen in FIG. 10 with ground contact 102 shown in FIGS. 8 and 9. Ground contact 102 includes a body section 104 and plate sections 106,108 upstanding from opposed edges of body section 104. Plate section 106 includes two cable-receiving slots 110,112 and plate section 108 includes two cable-receiving slots 114,116, all extending from entrances 118 at upper edges 120,122 to the body section 104. The centerlines of cable-receiving slots 110 and 114 are aligned with each other in an associated pair for receipt of the same cable end portion thereinto when the centerlines are aligned with a cable path during application of enclosure 10 to a cable splice connection, and likewise slots 112 and 116 are coaligned and associated as a pair for receipt of another cable end portion thereinto. Preferably slot entrances 118 are provided with widened mouths 124 to facilitate insertion of a cable thereinto, and facing edges along each slot include serrations 126 that will bite into a cable shield sufficiently to establish an assured ground connection therewith upon cable insertion.

Ground contact 102 is preferably adapted to permit the plate portions to flex or be pivoted during cable insertion. Joints of the plate sections with body section 104 are shown to be narrowed, especially at plate portions 128,130 adjacent ends 132,134 of body section 104. Further, relief slots 136,138 are formed in body section 104 extending from ends 132,134 to at least the centerlines of the cable-receiving slots adjacent the respective ends 132,134, defining cantilever beams 156. It can be said that plate portions 128,130 are defined on ends of cantilever beams 156 that can flex, so that the plate portions are pivoted outwardly from the cable-receiving slots as seen in FIG. 9 upon insertion of respective cable end portions into the cable-receiving slots. Outer side edges 140 are shown tapered for clearance when a plate portion is pivoted. Additionally, ribs 158 are formed along bottom surface 144 of first cover 12 (seen in FIG. 10) to elevate body section 104 of ground contact 102 to create clearance beneath cantilever beams 156 permitting deflection downwardly upon cable insertion into the cable-receiving slots.

When a cable end portion is inserted into a respective pair of slots 110,114 or 112,116, the exposed shield portion will be received into one of the slot pair, while a jacketed portion of the cable will be received into the other. The ground contact is adapted to accommodate receipt of the shield portion into one slot of the slot pair while the larger diameter jacketed portion is received into the other slot. With plate portions 128,130 being pivotable, the same slot width can accommodate either diameter and also variations in diameter tolerance during manufacture of the cable.

Referring particularly to FIG. 10, ground contact 102 may be affixed to first cover 12 by utilizing a pair of embossments 142 extending upwardly from inner surface 144 of first cover 12, with each embossment being received through a respective aperture of body section 104 or through outer ends of relief slots 136,138. Ground contact 104 is also shown having a pair of stiff lances 146 extending in opposite directions struck upwardly from body section 104 at relief slots 136,138 having free ends that will engage and form an assured interference fit against embossments 142 when the ground contact is forced into position in grounding region 100 of first cover 12, preferably with application tooling striking the lances after assembly of the ground contact to first cover 12 to firmly embed the free ends into the embossments. Other fastening techniques could be utilized such as heat staking the embossments to the body section or use of other fastening accessories or adhesive. Preferably, ground contact 102 is stamped and formed of copper alloy such as brass for good conductivity, and having a thickness of about 0.030 inches for stiffness; alternatively, stainless steel could be used. Sealant material preferably is deposited in the splice-receiving regions of both the first and second covers, and also into the grounding regions thereof, such as gel-like sealant material disclosed in European Patent Publication No. 0 529 957.

Grounding region 100 of first cover 12 is generally enclosed within upstanding wall sections 148 parallel to sidewalls 20,22 and upstanding wall sections 150 perpendicular thereto. Preferably upper edges of the wall sections will meet corresponding edges of corresponding wall sections of second cover 14, and preferably embossments 152 are provided along wall sections of both covers that meet and thus provide crush-resistance in the center of enclosure 10 upon closure about a cable splice. Gaps 154 are also seen to be provided around the periphery of grounding region 100 that permit extrusion of sealant material therethrough upon closure of the covers about the cable splice connection and also minimize interfering engagement with pivoting plate portions of ground contact 102 secured within the upstanding wall sections 148,150 of first cover 12. First and second covers 12,14 are also seen to include upstanding wall sections 92 and embossments 94 adjacent splice-receiving region 90 that enhance crush-resistance of the enclosure and also serve to inhibit flow of sealant material out of the splice-receiving region, as seen in FIG. 1.

Figure 11:
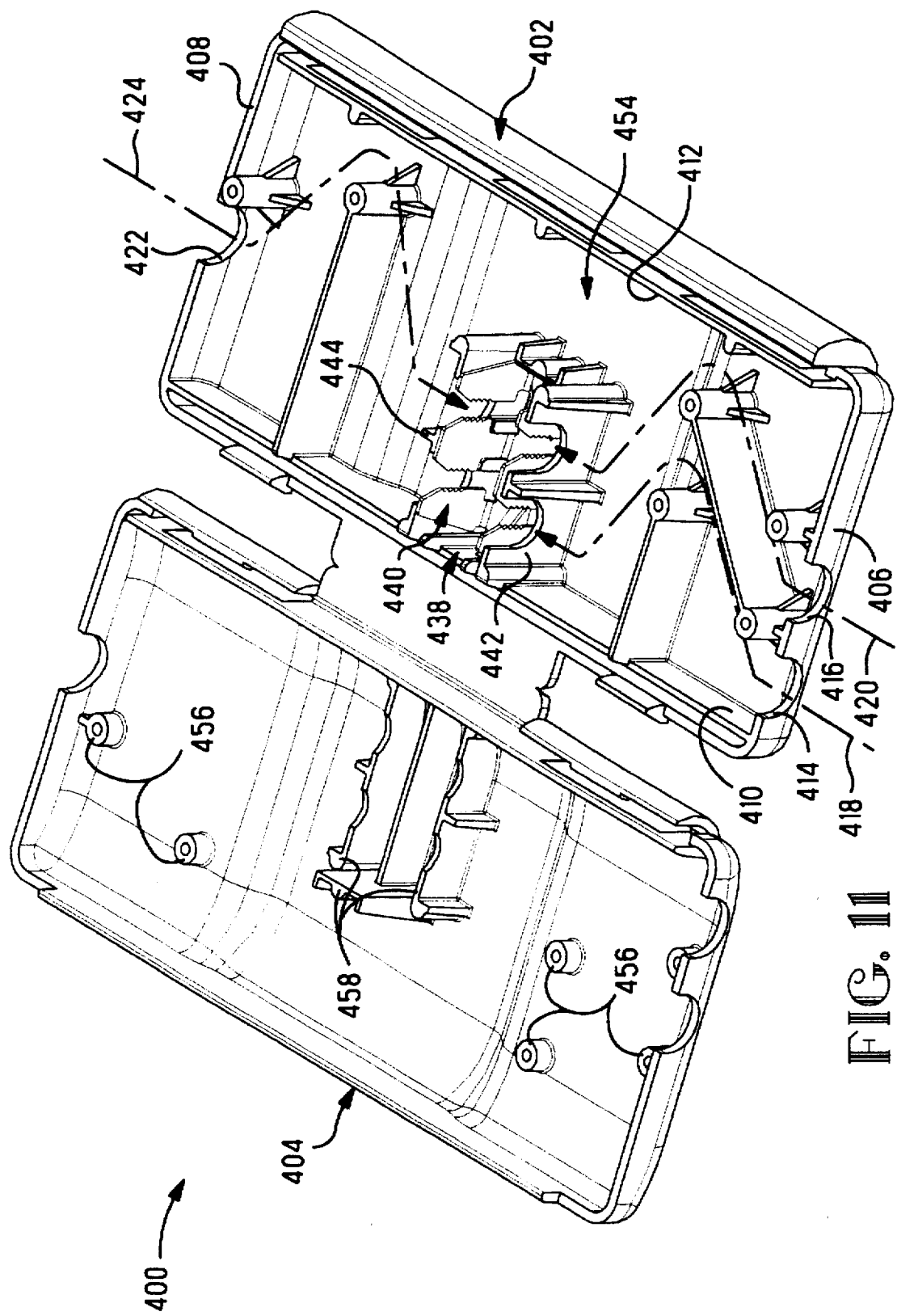
FIGS. 11 to 14 are isometric views of two additional embodiments of splice enclosures of the present invention having serpentine routing channels, with the enclosure of FIGS. 13 and 14 including a linear routing channel for a single-conductor coaxial cable beside an in-line multiconductor cable splice.
Figure 12:
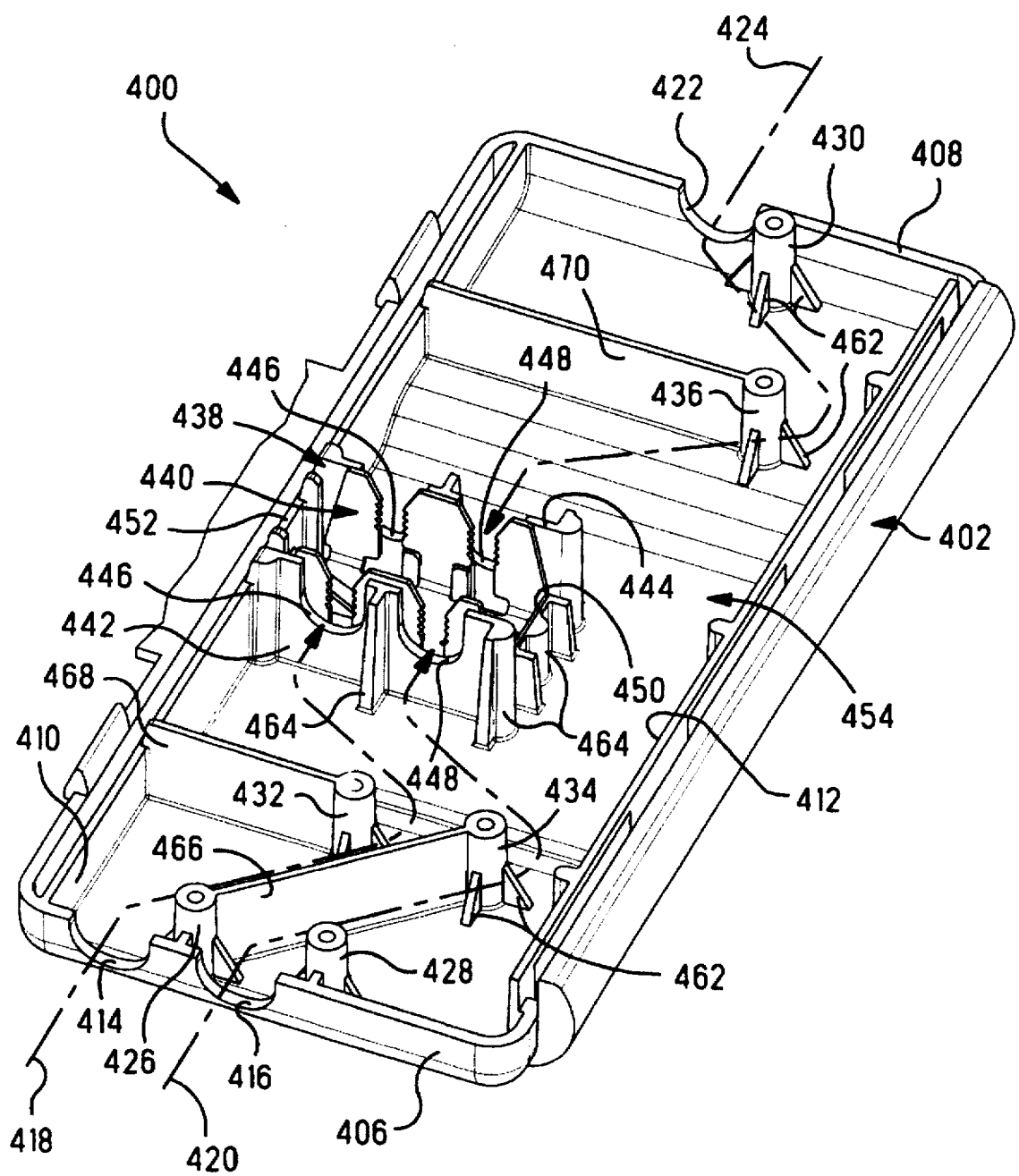

In FIGS. 11 and 12 are seen additional embodiments of the enclosure of the present invention. In FIG. 11, enclosure 400 has first and second covers 402,404,first and second opposed ends 406,408 and opposed first and second sides 410,412. Provision is made in enclosure 400 for first enclosure end 406 to have two cable entrances 414,416 generally positioned toward first enclosure side 410 and two routing channels 418,420 generally indicated by dashed lines, while second enclosure end 408 has only one cable entrance 422 and one routing channel 424; enclosure 400 is shown to provide the capability of butt-splice or in-line cable splicing arrangements as with enclosure 10 of FIGS. 1 to 4 and may also be provided with a plug for closing the unused one of the (cable entrances.

First or outermost embossments 426,428,430 are positioned just inwardly of each of the cable entrances and to one side thereof toward second enclosure side 412. Second or innermost embossments 432,434,436 are spaced inwardly from the outermost embossments and further toward second enclosure side 412. Grounding region 438 with ground contact 440 is positioned adjacent first side 410 and includes transverse wall sections 442,444 outwardly of the ground contact each with cable openings 446,448 aligned with associated pairs of cable-receiving slots of ground contact 440. Grounding region 438 further includes an end wall section 450 and along with a portion of wall 452 of first side 410 thus surrounding the ground contact with wall structure. A splice-receiving region 454 is provided adjacent the grounding region to receive splices of conductors of the cables inserted into the enclosure.

It is seen that a cable being inserted into a respective routing channel must be bent about a distinct angle such as between about 40° and about 70° toward second enclosure side 412 to pass by outermost embossments 426,428,430 and extend to the innermost embossments, at an angle such as about 40° to 45° (for smaller diameter cable) from an original cable axis parallel with the enclosure sides. The cable must then be bent in a reverse direction toward first enclosure side 410 to pass by innermost embossments 432,434,436 to be oriented at an angle such as about −40° to −45° from parallel with respect to the original cable axis, to extend to associated cable openings 446,448, after which the cable must again be bent to achieve a direction parallel with the enclosure sides to be inserted into the associated pair of cable-receiving slots of the ground contact. For cables containing for example six twisted pairs of conductor wires such as telephone drop cable) and having a larger diameter, the angle assumed by the cable at the outer embossment may be 50° to 60° or 70° by reason of the position of the inner embossment relative to the outer embossment, and the total angle at the inner embossment may be from about 100° up to about 140°.

Embossments 426,428,430 and 432,434,436 are defined on first cover 402 and extend to free ends that virtually meet free ends of opposed embossments 456 of second cover 404, while transverse wall sections 442,444 and end wall section 450 of the grounding region extend to free ends that virtually meet free edges of opposed wall sections 458 and a portion of side wall 460 of second cover 404, providing crush resistance to the enclosure upon full closure thereof about a cable splice. Ground contact 440 can be said to serve as a cable clamping member for holding the end of the jacketed cable portion in position, even if the cables contain no ground shields requiring interconnection. Also, a simpler cable clamping arrangement could optionally be used, such as for cables not requiring shield interconnection, where a transverse wall contains a pair of spaced slots for receiving ends of the respective cables, especially where the slots are offset laterally from the innermost embossments 432,434, 436.

The generally elongate embossments of first cover 402 preferably are strengthened by buttresses 462, the wall sections of grounding region 438 are preferably strengthened by support embossments 464 providing the necessary cable strain relief and resistance to crushing, as in the embodiment of FIGS. 1 to 4. A barrier wall 466 is preferably provided between outermost embossment 426 and innermost embossment 434 to disallow a cable to be inserted through cable entrance 416 that is not bent substantially around both of embossments 428 and 434; similarly, barrier walls 468,470 are preferably provided between each of innermost embossments 432 and 436 and first side 410 necessitating cable routing appropriately around them to reach the grounding region.

Figure 13:
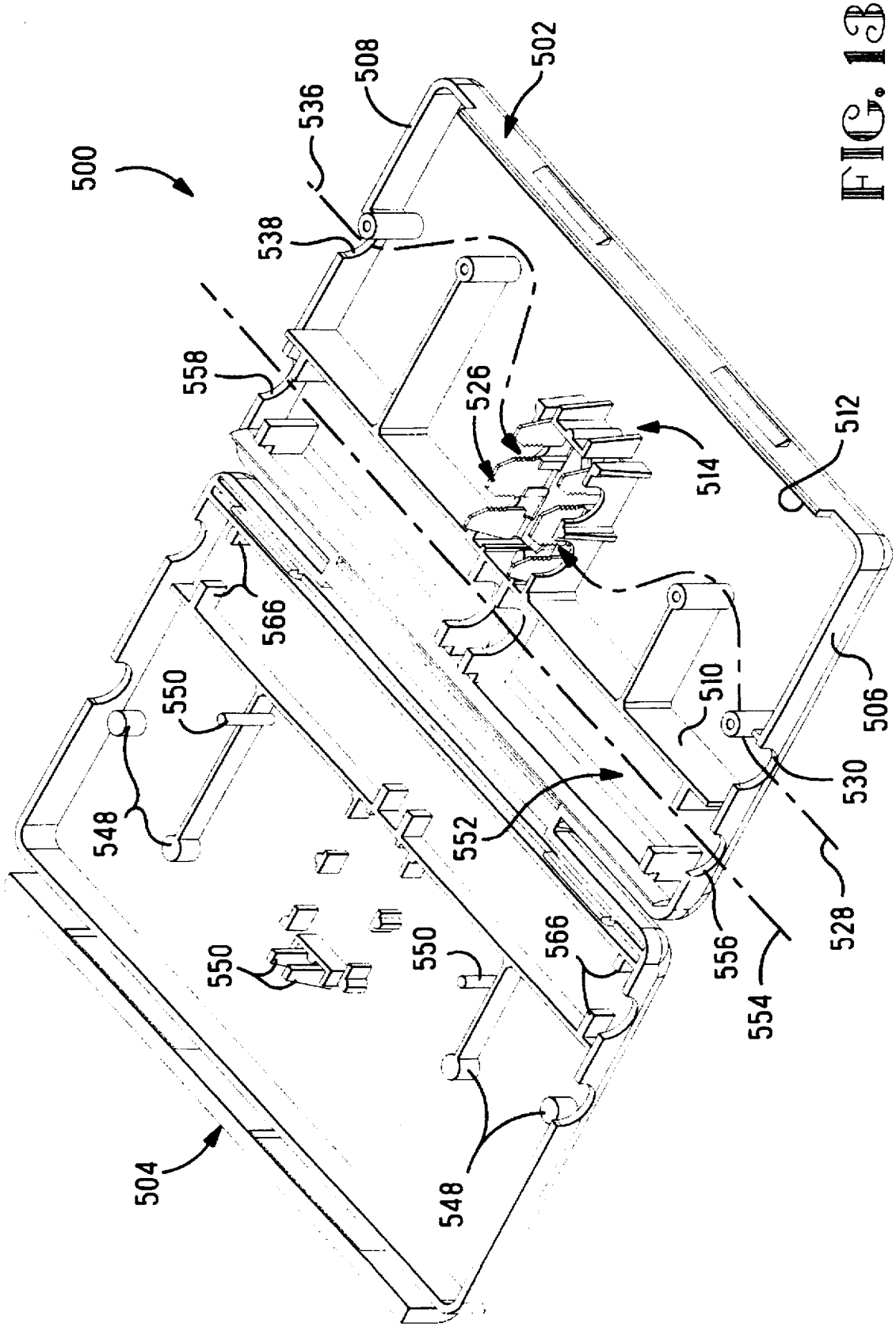
Figure 14:
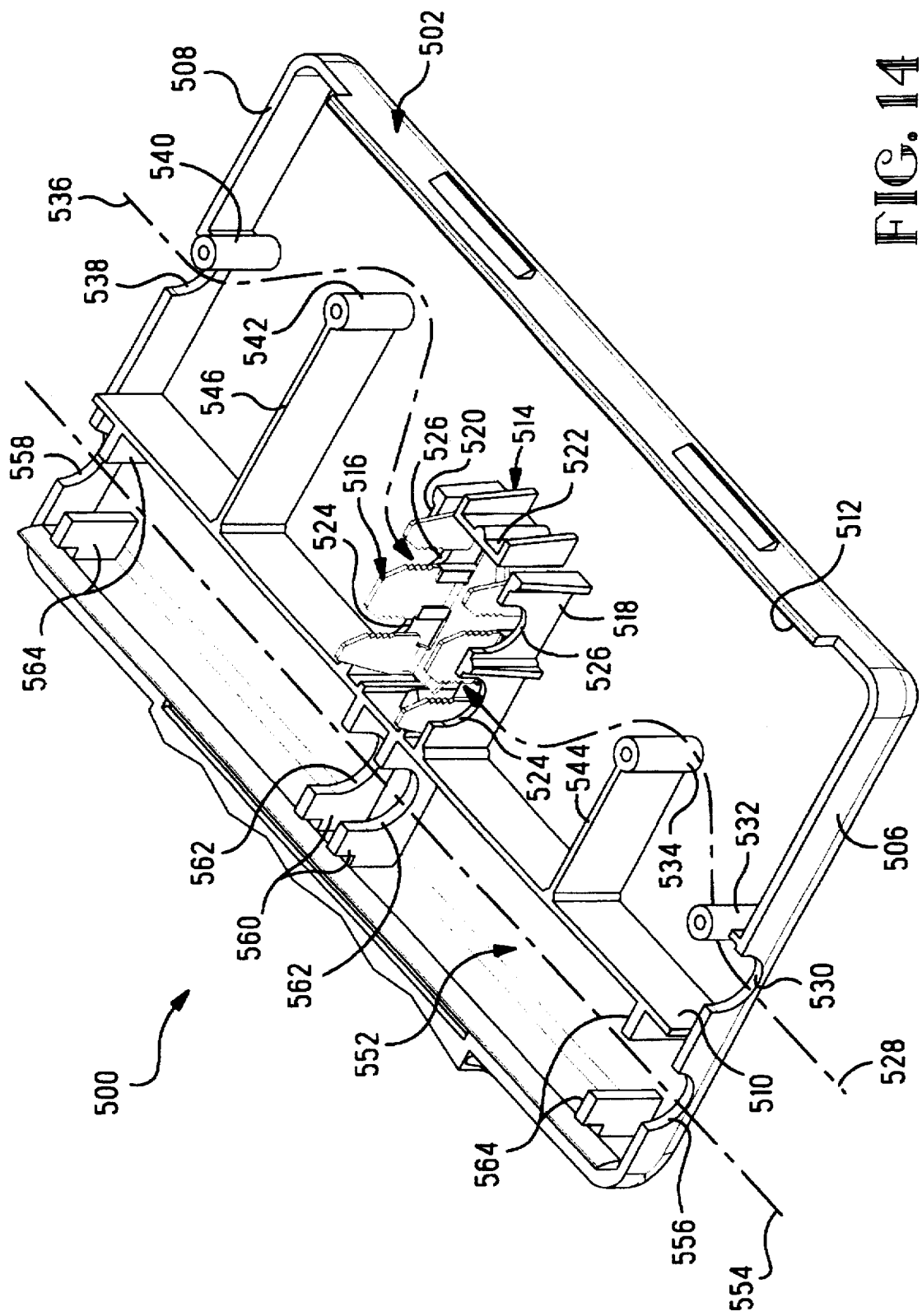

In FIGS. 13 and 14, enclosure 500 includes first and second covers 502,504, opposed first and second ends 506,508 and opposed first and second sides 510,512. Grounding region 514 is positioned proximate first side 510 and as in enclosure 400 of FIGS. 11 and 12 provides a ground contact 516 surrounded by transverse wall sections 518,520 and end wall section 522; and cable openings 524,526 are aligned with pairs of cable-receiving slots of the ground contact. Routing channel 528 extends from cable entrance 530 at first end 506 past laterally staggered outermost and innermost embossments 532,534, and second routing channel 536 extends from cable entrance 538 at second end 508 past laterally staggered outermost and innermost embossments 540,542, both routing channels thus being serpentine in shape so that the cables inserted thereinto must be bent substantially to extend first toward one side and then the other to reach associated cable openings of the grounding region. As in enclosure 400 of FIGS. 11 and 12, barrier walls 544,546 are provided between innermost embossments 534,542 and first side 510 to necessitate that cables inserted into the enclosure must be appropriately bent around them to reach the grounding region. In addition to embossments 548 of second cover 504 that virtually meet the ends of the embossments of the first cover, elongate supplemental embossments 550 are seen provided on second cover 504 to virtually meet the inner surface of first cover 502 and provide supplemental crush resistance.

Enclosure 500 also includes a partitioned region 552 along first side 510 and extending between first and second ends 506,508, defining a linear routing channel 554 extending between cable entrances 556,558 at the opposed enclosure ends. Partitioned region 552 provides for receipt thereinto of a coax cable splice similar to that of the enclosure disclosed in U.S. Pat. No. 5,397,859 and U.S. patent application Ser. No. 08/263,899 filed Jun. 21, 1994 and assigned to the assignee hereof. A pair of flanges 560 are provided spaced apart midway between first and second ends 506,508 having semicylindrical cutouts 562 to receive portions of a coax connector used to splice ends of a pair of coax cables (not shown) and providing stops when abutted by collars of the coax connector were the cable splice to be urged axially with respect to the enclosure. Sealant material may preferably be placed along partitioned region 552 for embedding and sealing the exposed portions of the coax connector, and wall sections 564,566 preferably are provided on first and second covers 502,504 in pairs along each side of the cable channel near cable entrances 556,558 to provide a level of crush resistance to the partitioned region and to impede the extrusion of sealant material to the cable entrances upon full closure of the enclosure. Enclosure 500 is seen to be adapted to provide for splices between a pair of multiconductor shielded cables in an in-line cable arrangement, and also between a pair of conventional single signal conductor coax cables.

The enclosures of the present invention may be used with cables not having shields requiring ground interconnection, wherein the ground contact acts merely as a clamp for the outer jackets of both cables. Variations and modifications may be devised that are within the spirit of the invention and the scope of the claims.

What is claimed is:

1. An enclosure for being secured about a splice connection of a pair of electrical cables and having opposed first and second cover members adapted to be secured to each other about the splice connection to define the enclosure therearound, said enclosure comprising a splice-receiving region between opposed ends of said enclosure, said first cover defining at least one routing channel extending to said splice-receiving region from a respective cable entrance at each of said opposed enclosure ends, said first cover including at least two embossments spaced inwardly from said enclosure ends and along said routing channel and extending inwardly from respective inner cover surfaces, and said embossments being so positioned to require that said cables inserted therealong must be bent sequentially at two spaced locations and toward opposite sides of said first cover to pass by said embossments during cable insertion to extend between respective said cable entrances and said splice-receiving region, said routing channel thereby being serpentine and said cables being bent around said embossments defining a cable strain relief.

2. The enclosure as set forth in claim 1 wherein said embossments extend to free ends dimensioned and positioned to meet embossment free ends of said second cover member upon closure of said enclosure about said splice connection.

3. The enclosure of claim 1 wherein said enclosure includes a partitioned section extending between cable exits at said opposed ends of said enclosure, defining a cable-receiving channel isolated from a ground region for receipt therealong of an additional cable length.

4. The enclosure of claim 3 wherein said cable length includes a spliced interconnection between two cable ends.

5. The enclosure of claim 1 wherein a cable-gripping member is affixed to said first cover member at a location centrally of said enclosure ends, and said cable gripping member includes at least two cable-receiving slots defined in at least one wall section thereof generally parallel to said enclosure ends so that said cables received into said slots must be oriented generally parallel to said first cover sides, and innermost ones of said embossments along said routing channel are laterally offset in a selected direction from said cable receiving slots and remote from one of said first cover sides necessitating said cables to be bent around said innermost ones of said embossments in order to align said cables with associated said cable receiving slots, thereby enhancing said cable strain relief of said enclosure.

6. The enclosure of claim 1 wherein a ground contact is affixed to said first cover member at grounding region adjacent said splice-receiving region for engaging and electrically connecting to shield members of said cable pair, with said ground contact including a pair of cable-receiving slots each aligned to receive a respective one of said cables thereinto, and said grounding region is positioned adjacent a first one of said first cover sides and said first cover member generally surrounds said grounding region with upstanding wall sections, with transverse ones of said wall sections being positioned adjacent and along outer surfaces of plate sections of said ground contact and having cable openings thereinto aligned with said cable-receiving slots of said ground contact, and innermost ones of said embossments along said routing channel are laterally offset in a selected direction from said cable openings and remote from said first one of said first cover sides necessitating said cables to be bent around said innermost ones of said embossments in order to align said cables with associated said cable openings, thereby enhancing said cable strain relief of said enclosure.

7. The enclosure of claim 6 wherein said routing channel extends from an associated said cable entrance at from about 40° to about 70° toward a second one of said first cover sides from a direction parallel thereto until reaching one of said innermost embossments associated with said routing channel, and then extends from said innermost embossment at from about 40° to about 70° toward said first one of said first cover sides from said parallel direction, until reaching a position adjacent and aligned with a respective one of said cable openings of said grounding region wall sections.

8. The enclosure of claim 6 wherein said enclosure includes an additional routing channel coextending from an additional respective cable entrance at a first of said enclosure ends, whereby said enclosure is adapted to receive end portions of two of said cables either both entering said first enclosure end in a parallel cable routing arrangement, or each entering a respective one of said first end and a second of said enclosure ends in an in-line cable routing arrangement.

* * * * *